3,712,817
DRY WORKING PHOTOSENSITIVE COMPOSITIONS COMPRISING ORGANIC HALOGEN COMPOUNDS, ETHYLENE COMPOUNDS AND CARBINOL COMPOUNDS
Andrew C. Hazy, Mentor, Ohio, assignor to Horizons Incorporated, a division of Horizons Research Incorporated
No Drawing. Filed Mar. 1, 1971, Ser. No. 119,883
Int. Cl. G03c 5/24, 1/52
U.S. Cl. 96—48 R  8 Claims

ABSTRACT OF THE DISCLOSURE

The compound 1,1-bis-(4-dimethylaminophenyl)ethanol, its preparation and its use in light sensitive compositions particularly suited to reconnaissance film of dry processed, high resolution light sensitive material.

The invention herein described was made in the course of, or under a contract with the United States Air Force, Air Force Systems Command, Aeronautical Systems Division, Wright-Patterson Air Force Base.

The reaction of methyl Grignard reagent with Michler's ketone, under classical conditions, involving hydrolysis by dilute aqueous acid, is described in the literature as a reaction which produces an ethylene, presumably as a consequence of spontaneous dehydration of the intermediate substituted ethanol [1,1-bis-(4-dimethylaminophenyl)ethanol] which decomposes as it forms under the specified reaction conditions.

It has been found that the substituted ethanol can be prepared by reacting methyl Grignard with Michler's ketone under mild conditions, e.g., at room temperature or below, and hydrolyzing the reaction mixture with dilute aqueous alkali.

The substituted ethanol is readily recovered from the hydrolyzed mixture by drying, then precipitating the product with petroleum ether, and finally separating the desired compound by filtration, the desired compound being the precipitate.

It has been found that the incorporation of small amounts of the substituted ethanol in formulations for light sensitive films lowers the energy required for obtaining a net unit density by a factor of two as compared with the energy required to produce the same net density in an otherwise identical film to which the substituted ethanol has not been added.

In the examples which follow, there are described the preparation and properties of the compound 1,1-bis(4-dimethylaminophenyl)ethanol represented by the structural formula

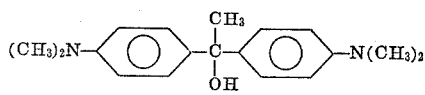

and its use in photosensitive film compositions. The examples are to be construed as illustrative and are not intended to limit the invention in any way.

EXAMPLE 1

Preparation of 1,1-bis(p-dimethylaminophenyl)ethanol

To a hot, vigorously stirred solution of 26.8 g. (0.10 mole) of Michler's ketone in 500 ml. of benzene was added 34.5 ml. (0.10 mole) of 2.9 M methyl magnesium chloride in tetrahydrofuran over a 5 minute period. The resulting mixture was chilled (ice bath) and treated with a solution of 1.0 g. of sodium hydroxide in 40 ml. of water. The mixture was then dried over anhydrous potassium carbonate and filtered. The filtrate was stirred and treated with petroleum ether causing the desired product to precipitate. The precipitated white solid was collected by suction filtration, washed with petroleum ether and dried in vacuum at room temperature yielding 17.7 g. of solid (62% yield), M.P. 112–114°. The infrared spectrum of the product (KBr pellet) showed strong absorption at $3\mu$ (O—H stretch). Analysis of the product was C, 75.99, H 8.24, N 9.58, as compared with theoretical values C 76.02, H 8.51, N 9.85.

EXAMPLE 2

A photosensitive film was formulated according to the prior art, as described in U.S. Pat. 3,533,792 issued Oct. 13, 1970, and U.S. Pat. 3,510,304 issued May 5, 1970, the disclosures of which are incorporated by reference.

The film was formulated by following the procedures set forth in the above noted references and evaluated as described in Photographic Science and Engineering, vol. IX, No. 2, pp. 113–137, March-April 1965 and in vol. V, No. 2, pp. 98–103, March-April 1961.

The composition was prepared by adding the following ingredients (in the order indicated) to a solution of a polycarbonate resin dissolved in methylene chloride:

| | Mg. |
|---|---|
| Iodoform ($CHI_3$) | 300 |
| 4-(methylthio)phenol | 60 |
| Triphenylstibine | 10 |
| Mercapto acetanilide | 10 |
| 1,1-bis-(p-dimethylaminophenyl)ethylene | 200 |
| 3-ethyl-5-[(3-ethyl-2(3H)-benzoxazolylidene)ethylidene]rhodanine | 2.5 |
| 2,5-dimethoxy-4′-aminostilbene | 5 |

The formulation was coated 0.0015 inch thick (wet) on 500D Mylar polyester film support by means of a doctor knife blade, and permitted to "dry" by evaporation of the methylene chloride. When this film was exposed to radiation at 488 nm. ($\pm 5$ nm.) it required 240 ergs/cm.$^2$ to produce a net density of unity.

For comparison, the identical formulation was prepared, except that 20 mg. of 1,1-bis(p-dimethylaminophenyl)ethanol was added and for achieving net unit density, the same type of exposure now required only 145 ergs/cm.$^2$ with the substituted ethanol.

EXAMPLE 3

Another film was formulated using a formulation similar to that described first in Example 2. For a net density of unity, an exposure of 665 ergs/cm.$^2$ was required.

Replacing 5 mg. of the 1,1-bis(p-dimethylaminophenyl) ethylene with 5 mg. of 1,1-bis(p-dimethylaminophenyl) ethanol resulted in a film which required only 165 ergs/cm.$^2$ for net density equal to 1.

EXAMPLE 4

A film containing 170 mg. of 1,1-bis(p-dimethylaminophenyl)ethylene; 2.5 mg. of 3 - ethyl - 5[(3-ethyl-2(3H) benzoxazolylidene)ethylidene]rhodanine; 10 mg. of 2,5-dimethoxy-4'-aminostilbene; 280 mg. of iodoform; 50 mg. of 4-(methylthio)phenol; 8 mg. of mercaptoacetanilide and 10 mg. of triphenylstibine in 5 cc. of 15.5% polycarbonate in methylene chloride solution was coated on 500D Mylar. This film required 120 ergs/cm.$^2$ for net d.=1. An otherwise identical formula with 20 mg. of carbinol added, required only 45 ergs/cm.$^2$ for net d.=1.

EXAMPLE 5

A film as described in Example 4 without the carbinol, 1,1-bis-(p-dimethylaminophenyl)ethanol, but containing 15 mg. of mercaptoacetanilide instead of 8 mg. required 54 ergs/cm.$^2$ for net d.=1. Addition of 30 mg. of carbinol 1,1-bis(p-dimethylaminophenyl)ethanol gave a film requiring 27 ergs/cm.$^2$ for net d.=1. When 60 mg. of carbinol 1,1-bis-(p-dimethylaminophenyl)ethanol was used, net d.=1 was achieved by an exposure of 10 ergs/cm.$^2$. The use of 100 mg. of carbinol 1,1-bis-(p-dimethylaminophenyl)ethanol gave a film which gave net d.=1 from 57 ergs/cm.$^2$.

As taught in U.S. Pat. 3,510,304, various substitutions may be made in the above formulation without departing from the intended scope of the invention.

For instance, other ethylene compounds may be used in place of the dimethylaminophenyl ethylene compound of the specific example, including other substantially colorless ethylene compounds represented by the general formula

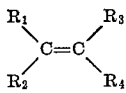

wherein $R_1$ and $R_2$ each represent a p-dialkylaminophenyl group in which the alkyl groups are selected from the group consisting of methyl and ethyl, and each of $R_3$ and $R_4$ represent a monovalent material selected from the group consisting of H, halogen, alkyl, aryl, and other monovalent groups which do not interfere with the resonance of the ethylenic double bond connecting the two carbon atoms.

Further, instead of triphenylstibine, other triaryl Group V compounds may be used, such as triphenylarsine, phosphine or bismuthine, as described in U.S. Pat. 3,275,443 issued Sept. 27, 1966, to Eugene Wainer.

Similarly, it is possible to use other organic halogen compounds, as described in U.S. Pat. 3,042,515 issued July 3, 1962, to Eugene Wainer, instead of the preferred iodoform, i.e., the free radical source may be any compound represented by the general formula A—C—$X_3$ wherein each X represents an iodine, bromine or chlorine atom and not all of the X's need be the same and A represents a monovalent substance taken from the group consisting of H, Cl, Br, I, alkyl, aryl, aroyl, and the like.

Other carbinols which can be used in the same way as the compound 1,1-bis(4-dimethylaminophenyl)ethanol are represented by the general formula

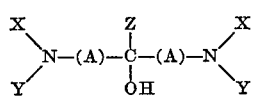

in which each A represents phenyl, naphthyl or diphenyl and each X and Y represents H, methyl or ethyl and Z represents an alkyl group, i.e. ethyl or methyl.

Except for the novel carbinols described in the present specification, the relative proportions of the several constituents in the photosensitive compositions of this invention are generally those set forth in U.S. Pat. 3,510,304.

As seen from the examples, the inclusion of various additives diminishes the amount of energy to produce a useful image from the photosensitive compositions of this invention. The ingredients are "optional" in the sense that they are not required for the production of an image, although they may contribute to its appearance and stability. In the sense of being essential, only three constituents are considered to be essential, namely:

the iodoform;
the 1,1-bis(p-dimethylaminophenyl)ethylene; and
the 1,1-bis(p-dimethylaminophenyl)ethanol or their equivalents.

The compositions of this invention are prepared as thin films as described in the articles noted in Example 2, and then exposed to a pattern of radiant energy whereby a neutral or nearly black image prints out directly as a result of said exposure, and the image may be fixed by heating the same. Or the composition may be formulated to produce an image having a desired color when exposed to a pattern of U.V. or visible radiation. The image may be developed and intensified by exposing the entire composition to radiant energy having a wavelength greater than 6500 angstrom units. The image may then be fixed by heating.

Further, as described in the patents noted in Example 2, the thin film may be given a blanket exposure to suitable radiation in the visible before it is exposed to a pattern of radiant energy.

I claim:
1. A photosensitive composition comprising:
   (a) an organic halogen compound having at least three halogen atoms attached to a terminal carbon atom;
   (b) a substantially colorless ethylene compound represented by the formula

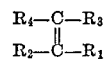

wherein $R_1$ and $R_2$ each represent a p-dialkylaminophenyl group in which the alkyl groups are selected from the group consisting of methyl and ethyl, and each of $R_3$ and $R_4$ represents a monovalent material selected from the group consisting of H, halogen, alkyl, aryl, and other monovalent groups which do not interfere with the resonance of the ethylenic double bond connecting the two carbon atoms;
   (c) a carbinol represented by the general formula

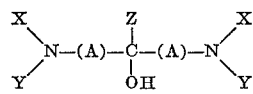

wherein each A represents phenyl, naphthyl or diphenyl and each X and Y represents H, methyl or ethyl and Z represents methyl or ethyl.

2. The composition of claim 1 including at least one additional compound which enhances the formation of the direct printout image and which is selected from the group consisting of picoline-1-oxide, triaryl compounds of an element selected from the group consisting of Sb, As, Bi and P, and di-t-butyl-p-cresol.

3. The composition of claim 1 in which (b) is 1,1-bis-(p-dimethylaminophenyl) ethylene.

4. The composition of claim 1 in which (c) is 1,1-bis-(p-dimethylaminophenyl) ethanol.

5. The composition of claim 1 wherein the constituents are iodoform; 4-(methylthio)phenol; triphenylstibine; mercapto acetanilide; 1,1-bis-(p-dimethylaminophenyl) ethylene; 3 - ethyl-5-[(3-ethyl-2(3H)-benzoxazolyidene) ethylidene]rhodanine; and 2,5-dimethoxy-4'-aminostilbene.

6. A dry working photographic process which comprises preparing composition of claim 1 in a thin film; exposing said composition to a pattern of radiant energy, whereby a neutral or nearly black image prints out directly as a result of said exposure; and fixing said image in said composition by heating the same.

7. A process for producing an image having a desired color which comprises exposing a photosensitive composition according to claim 1 to a pattern of ultraviolet or visible radiant energy and then developing and intensifying the image produced as a result of said photographic exposure by exposing the entire composition to radiant energy having a wavelength greater than 6500 angstrom units; and fixing said image in said composition by heating the same.

8. The photographic process of claim 6 wherein the thin film is given a blanket exposure to suitable radiation in the visible prior to exposing it to a pattern of radiant energy and the radiant energy to which it is then exposed has a wavelength greater than 6500 angstrom units.

References Cited

UNITED STATES PATENTS

| | | | |
|---|---|---|---|
| 3,510,304 | 5/1970 | Fichter, Jr., et al. | 96—90 X |
| 3,443,945 | 5/1969 | Fichter, Jr., et al. | 96—90 X |

J. TRAVIS BROWN, Primary Examiner

W. H. LOUIE, Jr., Assistant Examiner

U.S. Cl. X.R.

96—48 QP, 48 HD, 45 Z, 90 R